US009088478B2

(12) United States Patent
Craig et al.

(10) Patent No.: US 9,088,478 B2
(45) Date of Patent: Jul. 21, 2015

(54) METHODS, SYSTEMS, AND COMPUTER READABLE MEDIA FOR INTER-MESSAGE PROCESSOR STATUS SHARING

(75) Inventors: Jeffrey Alan Craig, Durham, NC (US); Mark Edward Kanode, Apex, NC (US); Kedar Kashinath Karmarkar, Pune (IN); David Michael Sprague, Raleigh, NC (US); Donald E. Wallace, Evergreen, CO (US)

(73) Assignee: TEKELEC, INC., Morrisville, NC (US)

( * ) Notice: Subject to any disclaimer, the term of this patent is extended or adjusted under 35 U.S.C. 154(b) by 0 days.

(21) Appl. No.: 13/026,105

(22) Filed: Feb. 11, 2011

(65) Prior Publication Data

US 2011/0202677 A1   Aug. 18, 2011

Related U.S. Application Data

(60) Provisional application No. 61/304,310, filed on Feb. 12, 2010.

(51) Int. Cl.
| | | |
|---|---|---|
| *G06F 15/173* | (2006.01) | |
| *H04L 12/759* | (2013.01) | |
| *H04L 29/06* | (2006.01) | |
| *H04L 12/721* | (2013.01) | |
| *H04L 12/26* | (2006.01) | |
| *H04L 12/773* | (2013.01) | |
| *H04L 12/703* | (2013.01) | |

(52) U.S. Cl.
CPC .......... *H04L 45/028* (2013.01); *H04L 43/0805* (2013.01); *H04L 45/34* (2013.01); *H04L 63/0892* (2013.01); *H04L 69/08* (2013.01); H04L 45/28 (2013.01); H04L 45/60 (2013.01)

(58) Field of Classification Search
None
See application file for complete search history.

(56) References Cited

U.S. PATENT DOCUMENTS

| 4,888,726 A | * | 12/1989 | Struger et al. ............... 709/201 |
|---|---|---|---|
| 5,008,929 A | | 4/1991 | Olsen et al. |
| 5,142,622 A | | 8/1992 | Owens |
| 5,208,811 A | | 5/1993 | Kashio et al. |

(Continued)

FOREIGN PATENT DOCUMENTS

| CA | 2239764 | 12/1998 |
|---|---|---|
| CA | 2 716 544 A1 | 12/2010 |

(Continued)

OTHER PUBLICATIONS

Final Official Action for U.S. Appl. No. 12/906,816 (Feb. 21, 2012).

(Continued)

*Primary Examiner* — Scott B Christensen
(74) *Attorney, Agent, or Firm* — Jenkins, Wilson, Taylor & Hunt

(57) ABSTRACT

According to one aspect, the subject matter described herein includes a method of operating a Diameter signaling router (DSR) for routing Diameter messages. The method includes steps occurring at a DSR comprising a plurality of Diameter message processors, each configured to perform at least one Diameter function. The method also includes detecting, at a first of the plurality of Diameter message processors, a change in status relating to the at least one Diameter function. The method further includes communicating, by the first of the plurality of Diameter message processors and to a second of the plurality of Diameter message processors, an indication of the change in status.

19 Claims, 7 Drawing Sheets

(56) References Cited

U.S. PATENT DOCUMENTS

| | | |
|---|---|---|
| 5,228,083 A | 7/1993 | Lozowick et al. |
| 5,239,542 A | 8/1993 | Breidenstein et al. |
| 5,384,840 A | 1/1995 | Blatchford et al. |
| 5,420,916 A | 5/1995 | Sekiguchi |
| 5,430,727 A | 7/1995 | Callon |
| 5,509,010 A | 4/1996 | La Porta et al. |
| 5,568,487 A | 10/1996 | Sitbon et al. |
| 5,581,558 A | 12/1996 | Horney, II et al. |
| 5,583,927 A | 12/1996 | Ely et al. |
| 5,586,177 A | 12/1996 | Farris et al. |
| 6,809,028 B2 | 1/1997 | Brockman et al. |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,719,861 A | 2/1998 | Okanoue |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,771 A | 8/1998 | Darland et al. |
| 5,802,285 A | 9/1998 | Hirviniemi |
| 5,809,028 A | 9/1998 | Nethercott et al. |
| 5,812,781 A | 9/1998 | Fahlman et al. |
| 5,815,669 A | 9/1998 | Lee et al. |
| 5,828,844 A | 10/1998 | Civanlar et al. |
| 5,831,975 A | 11/1998 | Chen et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A | 4/1999 | Longfield et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,966,431 A | 10/1999 | Reiman et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,365 A | 9/2000 | Yegoshin |
| 6,125,111 A | 9/2000 | Snow et al. |
| 6,125,177 A | 9/2000 | Whittaker |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,445 A | 11/2000 | Farris et al. |
| 6,154,467 A | 11/2000 | Hager et al. |
| 6,157,621 A | 12/2000 | Brown et al. |
| 6,157,710 A | 12/2000 | Figurski et al. |
| 6,167,025 A | 12/2000 | Hsing et al. |
| 6,178,181 B1 | 1/2001 | Glitho |
| 6,195,425 B1 | 2/2001 | Farris |
| 6,201,804 B1 | 3/2001 | Kikinis |
| 6,215,783 B1 | 4/2001 | Neyman |
| 6,236,722 B1 | 5/2001 | Gilbert et al. |
| 6,240,067 B1 | 5/2001 | Sorber |
| 6,273,622 B1 | 8/2001 | Ben-David |
| 6,278,697 B1 | 8/2001 | Brody et al. |
| 6,298,120 B1 | 10/2001 | Civanlar et al. |
| 6,304,273 B1 | 10/2001 | Bonnet |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,333,931 B1 | 12/2001 | LaPier et al. |
| 6,366,655 B1 | 4/2002 | Book et al. |
| 6,377,799 B1 | 4/2002 | Hameleers et al. |
| 6,400,813 B1 | 6/2002 | Birnhak |
| 6,415,027 B1 | 7/2002 | Malik |
| 6,442,169 B1 | 8/2002 | Lewis |
| 6,483,837 B1 | 11/2002 | Howell et al. |
| 6,487,286 B1 | 11/2002 | Reaves et al. |
| 6,507,649 B1 | 1/2003 | Tovander |
| 6,515,985 B2 | 2/2003 | Shmulevich et al. |
| 6,515,997 B1 | 2/2003 | Feltner et al. |
| 6,522,667 B1 | 2/2003 | Oda et al. |
| 6,529,524 B1 | 3/2003 | Liao et al. |
| 6,584,073 B1 | 6/2003 | Steele, Jr. et al. |
| 6,584,190 B1 | 6/2003 | Bressler |
| 6,594,258 B1 | 7/2003 | Larson et al. |
| 6,597,658 B1 | 7/2003 | Simmons |
| 6,611,532 B1 | 8/2003 | Madour et al. |
| 6,611,533 B1 | 8/2003 | Liao et al. |
| 6,625,170 B1 | 9/2003 | Curry et al. |
| 6,625,461 B1 | 9/2003 | Bertacchi |
| 6,631,133 B1 | 10/2003 | Christie et al. |
| 6,674,748 B1 | 1/2004 | Dykhuizen et al. |
| 6,678,242 B1 | 1/2004 | Simon |
| 6,681,009 B1 | 1/2004 | Graf et al. |
| 6,683,881 B1 | 1/2004 | Mijares et al. |
| 6,724,752 B1 | 4/2004 | Turtianien et al. |
| 6,725,401 B1 | 4/2004 | Lindhorst-Ko |
| 6,731,741 B1 | 5/2004 | Fourcand et al. |
| 6,735,621 B1 | 5/2004 | Yoakum et al. |
| 6,760,343 B1 | 7/2004 | Krishnamurthy et al. |

(56) References Cited

U.S. PATENT DOCUMENTS

| | | |
|---|---|---|
| 6,795,546 B2 | 9/2004 | Delaney et al. |
| 6,819,652 B1 | 11/2004 | Akhtar et al. |
| 6,865,153 B1 | 3/2005 | Hill et al. |
| 6,915,345 B1 | 7/2005 | Tummala et al. |
| 6,918,041 B1 | 7/2005 | Chen |
| 6,944,184 B1 | 9/2005 | Miller et al. |
| 6,954,790 B2 | 10/2005 | Forslöw |
| 6,967,956 B1 | 11/2005 | Tinsley et al. |
| 7,035,260 B1 | 4/2006 | Betta et al. |
| 7,042,877 B2 | 5/2006 | Foster et al. |
| 7,043,000 B2 | 5/2006 | Delaney et al. |
| 7,079,499 B1 | 7/2006 | Akhtar et al. |
| 7,079,524 B2 | 7/2006 | Bantukul et al. |
| 7,107,041 B1 | 9/2006 | O'Driscoll |
| 7,136,635 B1 | 11/2006 | Bharatia et al. |
| 7,197,036 B2 | 3/2007 | Craig |
| 7,257,636 B2 | 8/2007 | Lee et al. |
| 7,286,516 B2 | 10/2007 | Delaney et al. |
| 7,292,592 B2 | 11/2007 | Rune |
| 7,298,725 B2 | 11/2007 | Rune |
| 7,318,091 B2 | 1/2008 | Brendes et al. |
| 7,333,438 B1 | 2/2008 | Rabie et al. |
| 7,333,482 B2 | 2/2008 | Johansson et al. |
| 7,383,298 B2 | 6/2008 | Palmer et al. |
| 7,403,492 B2 | 7/2008 | Zeng et al. |
| 7,403,537 B2 | 7/2008 | Allison et al. |
| 7,466,807 B2 | 12/2008 | McCann et al. |
| 7,486,676 B1 | 2/2009 | Dunn et al. |
| 7,496,087 B2 | 2/2009 | Garnero et al. |
| 7,551,926 B2 | 6/2009 | Rune |
| 7,567,796 B2 | 7/2009 | Tammi et al. |
| 7,583,963 B2 | 9/2009 | Tammi et al. |
| 7,590,732 B2 | 9/2009 | Rune |
| 7,633,872 B2 | 12/2009 | Pitcher et al. |
| 7,633,969 B2 | 12/2009 | Caugherty et al. |
| 7,676,702 B2 * | 3/2010 | Basham et al. ............... 714/47.1 |
| 7,706,343 B2 | 4/2010 | Delaney et al. |
| 7,743,131 B2 | 6/2010 | Brendes et al. |
| 7,792,981 B2 | 9/2010 | Taylor |
| 7,804,789 B2 | 9/2010 | Craig et al. |
| 7,822,023 B2 | 10/2010 | Lahetkangas et al. |
| 7,894,353 B2 | 2/2011 | Li et al. |
| 7,898,957 B2 | 3/2011 | Lea et al. |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,041,021 B2 | 10/2011 | Xu et al. |
| 8,045,983 B2 | 10/2011 | Bantukul |
| 8,072,966 B2 * | 12/2011 | MeLampy et al. ............ 370/352 |
| 8,170,035 B2 | 5/2012 | Furey et al. |
| 8,170,055 B2 | 5/2012 | Fang et al. |
| 8,179,885 B2 | 5/2012 | Craig et al. |
| 8,219,697 B2 | 7/2012 | Langen et al. |
| 8,223,658 B2 | 7/2012 | Bahr |
| 8,224,928 B2 | 7/2012 | Brendes et al. |
| 8,260,930 B2 * | 9/2012 | Khan et al. .................... 709/226 |
| 8,359,015 B2 | 1/2013 | Swaminathan et al. |
| 8,468,267 B2 | 6/2013 | Yigang et al. |
| 8,478,828 B2 | 7/2013 | Craig et al. |
| 8,483,233 B2 | 7/2013 | Craig et al. |
| 8,498,202 B2 | 7/2013 | Kanode et al. |
| 8,504,630 B2 | 8/2013 | Craig et al. |
| 8,527,598 B2 | 9/2013 | Craig et al. |
| 8,532,110 B2 | 9/2013 | McCann et al. |
| 8,547,908 B2 | 10/2013 | Marsico |
| 8,554,928 B2 | 10/2013 | Craig et al. |
| 8,578,050 B2 | 11/2013 | Craig et al. |
| 8,601,073 B2 | 12/2013 | Craig et al. |
| 8,644,324 B2 | 2/2014 | Kanode et al. |
| 8,750,126 B2 | 6/2014 | McCann et al. |
| 8,792,329 B2 | 7/2014 | Kanode et al. |
| 8,792,334 B2 | 7/2014 | Craig et al. |
| 8,799,391 B2 | 8/2014 | Craig et al. |
| 2001/0024443 A1 | 9/2001 | Alriksson et al. |
| 2001/0029543 A1 | 10/2001 | Iwata et al. |
| 2001/0046227 A1 | 11/2001 | Matsuhira et al. |
| 2002/0018447 A1 | 2/2002 | Yamada et al. |
| 2002/0021661 A1 | 2/2002 | DeGrandpre et al. |
| 2002/0048360 A1 | 4/2002 | Zambre et al. |
| 2002/0049901 A1 | 4/2002 | Carvey |
| 2002/0051427 A1 | 5/2002 | Carvey |
| 2002/0069278 A1 | 6/2002 | Forslöw |
| 2002/0087723 A1 | 7/2002 | Williams et al. |
| 2002/0101860 A1 | 8/2002 | Thornton et al. |
| 2002/0103893 A1 | 8/2002 | Frelechoux et al. |
| 2002/0133494 A1 | 9/2002 | Goedken |
| 2002/0133534 A1 | 9/2002 | Forslow |
| 2002/0141346 A1 | 10/2002 | Garcia-Luna-Aceves et al. |
| 2002/0141386 A1 | 10/2002 | Minert et al. |
| 2002/0181507 A1 | 12/2002 | Jones |
| 2002/0191616 A1 | 12/2002 | Sarmiento et al. |
| 2003/0032432 A1 | 2/2003 | Red et al. |
| 2003/0076815 A1 | 4/2003 | Miller et al. |
| 2003/0095536 A1 | 5/2003 | Hu et al. |
| 2003/0115358 A1 | 6/2003 | Yun |
| 2003/0123436 A1 | 7/2003 | Joseph et al. |
| 2003/0169779 A1 | 9/2003 | Craig |
| 2003/0177221 A1 | 9/2003 | Ould-Brahim et al. |
| 2003/0179742 A1 | 9/2003 | Ogier et al. |
| 2003/0202507 A1 | 10/2003 | Nishida et al. |
| 2003/0225938 A1 | 12/2003 | Glasco et al. |
| 2004/0017799 A1 | 1/2004 | Pulkka |
| 2004/0037278 A1 | 2/2004 | Wong et al. |
| 2004/0042485 A1 | 3/2004 | Gettala et al. |
| 2004/0098612 A1 | 5/2004 | Lee et al. |
| 2004/0174880 A1 | 9/2004 | White et al. |
| 2005/0002417 A1 | 1/2005 | Kelly et al. |
| 2005/0003838 A1 | 1/2005 | McCann et al. |
| 2005/0099964 A1 | 5/2005 | Delaney et al. |
| 2005/0232236 A1 | 10/2005 | Allison et al. |
| 2005/0232407 A1 * | 10/2005 | Craig et al. .................... 379/229 |
| 2005/0235065 A1 | 10/2005 | Le et al. |
| 2005/0246545 A1 | 11/2005 | Reiner |
| 2005/0246716 A1 | 11/2005 | Smith et al. |
| 2005/0281399 A1 | 12/2005 | Moisey et al. |
| 2006/0023658 A1 | 2/2006 | Phillips et al. |
| 2006/0045249 A1 | 3/2006 | Li et al. |
| 2006/0067338 A1 | 3/2006 | Hua et al. |
| 2006/0077926 A1 | 4/2006 | Rune |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0172730 A1 | 8/2006 | Matsuda |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0225128 A1 | 10/2006 | Aittola et al. |
| 2006/0253563 A1 | 11/2006 | Yang et al. |
| 2006/0274744 A1 | 12/2006 | Nagai et al. |
| 2007/0008955 A1 | 1/2007 | Delaney et al. |
| 2007/0047539 A1 | 3/2007 | Agarwal et al. |
| 2007/0070980 A1 | 3/2007 | Phelps et al. |
| 2007/0076600 A1 | 4/2007 | Ekl et al. |
| 2007/0153995 A1 | 7/2007 | Fang et al. |
| 2007/0168421 A1 | 7/2007 | Kalyanpur et al. |
| 2007/0214209 A1 | 9/2007 | Maeda |
| 2007/0280447 A1 | 12/2007 | Cai et al. |
| 2007/0297419 A1 | 12/2007 | Askerup et al. |
| 2008/0025230 A1 | 1/2008 | Patel et al. |
| 2008/0039104 A1 | 2/2008 | Gu et al. |
| 2008/0043614 A1 | 2/2008 | Soliman |
| 2008/0075068 A1 | 3/2008 | Brendes et al. |
| 2008/0144602 A1 | 6/2008 | Casey |
| 2008/0167035 A1 | 7/2008 | Buckley et al. |
| 2008/0212576 A1 | 9/2008 | O'Neill |
| 2008/0301162 A1 | 12/2008 | Wall et al. |
| 2008/0317247 A1 | 12/2008 | Jeong et al. |
| 2009/0034512 A1 | 2/2009 | Bantukul et al. |
| 2009/0080440 A1 | 3/2009 | Balyan et al. |
| 2009/0083861 A1 | 3/2009 | Jones |
| 2009/0129271 A1 | 5/2009 | Ramankutty et al. |
| 2009/0138619 A1 | 5/2009 | Schnizlein et al. |
| 2009/0185494 A1 | 7/2009 | Li et al. |

(56) References Cited

U.S. PATENT DOCUMENTS

| | | | |
|---|---|---|---|
| 2009/0193071 A1 | 7/2009 | Qiu et al. | |
| 2009/0232011 A1 | 9/2009 | Li et al. | |
| 2009/0264096 A1 | 10/2009 | Cai et al. | |
| 2009/0265467 A1 | 10/2009 | Peles | |
| 2009/0319686 A1 | 12/2009 | Watanabe | |
| 2010/0017846 A1 | 1/2010 | Huang et al. | |
| 2010/0042525 A1 | 2/2010 | Cai et al. | |
| 2010/0135287 A1 | 6/2010 | Hosain et al. | |
| 2010/0251330 A1 | 9/2010 | Kroeselberg et al. | |
| 2010/0265948 A1 | 10/2010 | Patel et al. | |
| 2010/0299451 A1* | 11/2010 | Yigang et al. | 709/241 |
| 2010/0304710 A1 | 12/2010 | Sharma et al. | |
| 2011/0060830 A1 | 3/2011 | Kang et al. | |
| 2011/0116378 A1 | 5/2011 | Ramankutty et al. | |
| 2011/0116382 A1 | 5/2011 | McCann et al. | |
| 2011/0188397 A1 | 8/2011 | McCann et al. | |
| 2011/0199895 A1 | 8/2011 | Kanode et al. | |
| 2011/0199906 A1 | 8/2011 | Kanode et al. | |
| 2011/0200047 A1 | 8/2011 | McCann et al. | |
| 2011/0200053 A1 | 8/2011 | Kanode et al. | |
| 2011/0200054 A1 | 8/2011 | Craig et al. | |
| 2011/0202604 A1 | 8/2011 | Craig et al. | |
| 2011/0202612 A1 | 8/2011 | Craig et al. | |
| 2011/0202613 A1 | 8/2011 | Craig et al. | |
| 2011/0202614 A1 | 8/2011 | Craig et al. | |
| 2011/0202676 A1 | 8/2011 | Craig et al. | |
| 2011/0202684 A1 | 8/2011 | Craig et al. | |
| 2011/0225280 A1 | 9/2011 | Delsesto et al. | |
| 2011/0225281 A1 | 9/2011 | Riley et al. | |
| 2011/0225306 A1 | 9/2011 | Delsesto et al. | |
| 2011/0302244 A1 | 12/2011 | McCann et al. | |
| 2011/0314178 A1 | 12/2011 | Kanode et al. | |
| 2012/0155389 A1 | 6/2012 | McNamee et al. | |
| 2012/0218915 A1 | 8/2012 | Craig et al. | |
| 2012/0224524 A1 | 9/2012 | Marsico | |
| 2013/0039176 A1 | 2/2013 | Kanode et al. | |
| 2013/0346549 A1 | 12/2013 | Craig et al. | |
| 2014/0074975 A1 | 3/2014 | Craig et al. | |

FOREIGN PATENT DOCUMENTS

| | | |
|---|---|---|
| CN | 1809072 A | 7/2006 |
| CN | 101150512 A | 3/2008 |
| CN | 101151861 A | 3/2008 |
| CN | 101252788 A | 8/2008 |
| CN | 101494608 A | 7/2009 |
| CN | 101588606 A | 11/2009 |
| EP | 0 853 411 A2 | 7/1998 |
| EP | 1 014 735 | 12/1999 |
| EP | 1 054 568 | 5/2000 |
| EP | 1 026 861 A2 | 8/2000 |
| EP | 1 089 575 | 9/2000 |
| EP | 1 134 939 A1 | 9/2001 |
| EP | 1 206 079 A2 | 5/2002 |
| EP | 1 328 102 A1 | 7/2003 |
| EP | 1 465 385 A1 | 10/2004 |
| EP | 1 314 324 B1 | 8/2008 |
| EP | 1 290 854 B1 | 7/2010 |
| EP | 1 847 076 B1 | 2/2012 |
| WO | WO 97/11563 | 3/1997 |
| WO | WO 97/33441 | 9/1997 |
| WO | WO 97/42774 | 11/1997 |
| WO | WO 97/42776 | 11/1997 |
| WO | WO 98/28879 | 7/1998 |
| WO | WO 98/28885 | 7/1998 |
| WO | WO 98/28897 | 7/1998 |
| WO | WO 99/09759 | 2/1999 |
| WO | WO 99/16256 | 4/1999 |
| WO | WO 00/19758 | 4/2000 |
| WO | WO 00/22840 | 4/2000 |
| WO | WO 00/30369 | 5/2000 |
| WO | WO 00/31933 | 6/2000 |
| WO | WO 00/33519 | 6/2000 |
| WO | WO 00/54476 | 9/2000 |
| WO | WO 00/56032 | 9/2000 |
| WO | WO 01/11825 | 2/2001 |
| WO | WO 01/24499 | 4/2001 |
| WO | WO 01/37532 | 5/2001 |
| WO | WO 01 93526 A2 | 12/2001 |
| WO | WO 02/067511 A1 | 8/2002 |
| WO | WO 2008/087633 A2 | 7/2008 |
| WO | WO 2008/144927 A1 | 12/2008 |
| WO | WO 2009/058067 A1 | 5/2009 |
| WO | WO 2009/070179 A1 | 6/2009 |
| WO | WO 2009/128837 A1 | 10/2009 |
| WO | WO 2009/134265 A1 | 11/2009 |
| WO | WO 2011/047382 A2 | 4/2011 |
| WO | WO 2011/100587 A2 | 8/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100626 A2 | 8/2011 |
| WO | WO 2011/100629 A2 | 8/2011 |
| WO | WO 2011/100630 A2 | 8/2011 |
| WO | WO 2012/119147 A1 | 9/2012 |

OTHER PUBLICATIONS

Applicant-Initiated Interview Summary for U.S. Appl. No. 12/906,816 (Jan. 27, 2012).

Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).

Notification of Transmittal of the International Search Report and the Written Opinion of the International Searching Authority, or the Declaration for International Application No. PCT/US2011/024614 (Oct. 31, 2011).

Notification of Transmittal of the International Search Report and the Written Opinion of the International Searching Authority, or the Declaration for International Application No. PCT/US2011/024646 (Oct. 28, 2011).

Notification of Transmittal of the International Search Report and the Written Opinion of the International Searching Authority, or the Declaration for International Application No. PCT/US2011/024645 (Oct. 28, 2011).

Notification of Transmittal of the International Search Report and the Written Opinion of the International Searching Authority, or the Declaration for International Application No. PCT/US2011/024642 (Oct. 28, 2011).

Notification of Transmittal of the International Search Report and the Written Opinion of the International Searching Authority, or the Declaration for International Application No. PCT/US2011/024621 (Oct. 28, 2011).

Notification of Transmittal of the International Search Report and the Written Opinion of the International Searching Authority, or the Declaration for International Application No. PCT/US2011/024637 (Oct. 27, 2011).

Notification of Transmittal of the International Search Report and the Written Opinion of the International Searching Authority, or the Declaration for International Application No. PCT/US2011/024629 (Oct. 27, 2011).

Notification of Transmittal of the International Search Report and the Written Opinion of the International Searching Authority, or the Declaration for International Application No. PCT/US2011/024625 (Oct. 25, 2011).

Notification of Transmittal of the International Search Report and the Written Opinion of the International Searching Authority, or the Declaration for International Application No. PCT/US2011/024611 (Oct. 20, 2011).

(56) References Cited

OTHER PUBLICATIONS

Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Notification of Transmittal of the International Search Report and the Written Opinion of the International Searching Authority, or the Declaration for International Application No. PCT/US2010/053062 (Jun. 28, 2011).
Znaty, "Diameter, GPRS, (LTE+ePC=EPS), IMS, PCC, and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function(IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+) Universal Mobile Telecommunications Systems (UMTS); LTE IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core, Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.288 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).

(56) References Cited

OTHER PUBLICATIONS

Bhardwaj, "Roaming Hubbing & LTE," GSMA London, pp. 1-11 (May 19, 2009).
3GPP, "3rd Generation Partnership Project; Technical Specification Group Core Network and Terminals Diameter-based Protocols Usage and Recommendations in 3 GPP (Release 8)," 3GPP TR 29.909 V8.1.2 (Jan. 2009).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83. (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pp. 1-12 (Jul. 1998).
"Diameter Overview," referenced from www.ulticom.com/html/products/signalware-diameter-reference-guide.asp (Publication Date Unknown).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).
Non-Final Official Action for U.S. Appl. No. 13/026,081 (Sep. 12, 2012).
Non-Final Official Action for U.S. Appl. No. 13/026,112 (Aug. 29, 2012).
Non-Final Official Action for U.S. Appl. No. 12/183,414 (Jun. 6, 2012).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Commonly-assigned, co-pending U.S. Appl. No. 13/465,464 (Unpublished, filed May 7, 2012).
Notice of Allowance and Fee(s) due for U.S. Appl. No. 11/986,500 (Mar. 20, 2012).
Notice of Allowance and Fee(s) Due for U.S. Appl. No. 12/878,015 (Jan. 17, 2012).
Interview Summary for U.S. Appl. No. 12/878,015 (Nov. 9, 2011).
Final Official Action for U.S. Appl. No. 11/986,500 (Oct. 20, 2011).
Non-Final Official Action for U.S. Appl. No. 12/878,015 (Aug. 9, 2011).
Restriction/Election Requirement for U.S. Appl. No. 12/878,015 (May 24, 2011).
Communication regarding the expiry of the time limit within which notice of opposition may be filed for European Patent No. 1290854 (May 18, 2011).
Non-Final Official Action for U.S. Appl. No. 11/986,500 (Apr. 1, 2011).
Notice of Allowance and Fee(s) Due for U.S. Appl. No. 11/084,853 (May 24, 2010).
Communication under Rule 71(3) EPC for Application No. 01 939 711.6 (Feb. 9, 2010).
Final Official Action for U.S. Appl. No. 11/084,853 (Aug. 18, 2009).
Official Action for U.S. Appl. No. 11/986,493 (Jun. 9, 2009).
Official Action for U.S. Appl. No. 11/084,853 (Jan. 8, 2009).
Communication pursuant to Article 94(3) EPC for European Application No. 01 939 711.6 (Nov. 4, 2008).
Restriction/Election Requirement for U.S. Appl. No. 11/084,853 (Sep. 23, 2008).
Notice of Allowance and Fee(s) Due for U.S. Appl. No. 09/770,316 (Aug. 13, 2007).
Bates et al., "Multiprotocol Extensions for BGP-4," Network Working Group, RFC 4760 (Jan. 2007).
Official Action for U.S. Appl. No. 09/770,316 (Dec. 5, 2006).
3GPP, "3rd Generation Partnership Project; Technical Specification Group Services and System Aspects; IP Multimedia Subsystem (IMS); Stage 2," 3GPP TS 23.228, V6.15.0, p. 1-178 (Sep. 2006).
Advisory Action for U.S. Appl. No. 09/770,316 (Mar. 21, 2006).
Notice of Panel Decision from Pre-Appeal Brief Review for U.S. Appl. No. 09/770,316 (Feb. 14, 2006).
Communication pursuant to Article 96(2) EPC in European Application No. 01939711.6 (Feb. 6, 2006).
Rekhter et al., "A Border Gateway Protocol 4 (BGP-4)," Network Working Group, RFC 4271 (Jan. 2006).
Official Action for U.S. Appl. No. 09/770,316 (Jul. 27, 2005).
Official Action for U.S. Appl. No. 09/770,316 (Nov. 3, 2004).
Pai, "In-Building Wireless: The Next Generation," TelephonyOnline.com, pp. 1-4 (Jun. 30, 2004).
Restriction and/or Election Requirement for U.S. Appl. No. 09/770,316 (Jun. 14, 2004).
Handa, "In Building Wireless: The Next Generation," TMCnet.com, pp. 1-7 (Feb. 12, 2004).
Telcordia Technologies Specification of Signaling System No. 7, "Annex A: SS7 Message Priorities," GR-246-CORE, Issue 8 (Dec. 2003).
Fitchard, "A New Voice in the Boardroom," Wireless Review, pp. 1-3 (Sep. 1, 2003).
Chandra, "Capabilities Advertisement with BGP-4," Network Working Group, RFC 3392 (Nov. 2002).
"Fixed Wireless Technology," ISP Planet, pp. 1-4 (May 14, 2002).
International Search Report for International Application No. PCT/US01/17483 (Mar. 25, 2002).
Martinek, "Office on the Fly," Wireless Review, pp. 1-4 (Jul. 15, 2001).
"March Networks 3300 Integrated Communications Platformm," Mitel Networks Corporation, pp. 1-34 (Jul. 2001).
Sidebottom et al., "SS7 MTP3-User Adaptation Layer (M3UA)," Internet Draft, Network Working Group, pp. 1-79 (Nov. 2000).
"Digital Cellular Telecommunications System (Phase 2+) (GSM); Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1-65 (Sep. 2000).
Sidebottom et al., "SS7 MTP3-User Adaptation (M3UA)," Internet draft, IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).

(56) References Cited

OTHER PUBLICATIONS

Loughney, "IP-Based Signaling Needs in Radio Access Networks," Internet draft, draft-loughney-sigtran-ip-ran-00.txt, IETF SIGTRAN Working Group, p. 1-14, (Jun. 16, 2000).
Swartz, "Ready, Set, Wireless Office!," Wireless Review, pp. 1-4 (Jun. 1, 2000).
Sidebottom et al., "SS7 MTP3-User Adaptation Layer (M3UA)," Internet Draft, draft-ietf-sigtran-m3ua-02.txt, Network Working Group, pp. 1-56 (Mar. 10, 2000).
Loughney et al., "SS7 SCCP-User Adaptation Layer (SUA)," Internet draft, draft-loughney-sigtran-sua-00.txt, IETF Engineering Task Force, p. 1-53, (Mar. 8, 2000).
"The Wireless Business Connection," Second Quarter 2000 Report, The Phillips Group-Infotech, pp. 1-9, (2000).
"Ericsson Announces General Availability of Its Mobile Advantage Wireless Office System," Ericsson Press Release, pp. 1-2 (Nov. 4, 1999).
Ong et al., "Framework Architecture for Signaling Transport," Network Working Group, pp. 1-24 (Oct. 1999).
ITU-T Recommendation Q.2630.1 (Sep. 29, 1999).
O'Shea, "Mating Season," Telephony, p. 10-11, (Sep. 20, 1999).
"Corporate Offices to Go Wireless First Australian GSM on the Net Trial " Ericsson Press Release, pp. 1-3 (Aug. 11, 1999).
ITU-T Recommendation Q.2150.1 (Jun. 23, 1999).
"Ericsson Solution Chosen for World's First Combined DECT/GSM Communications Service," Ericsson, pp. 1-9 (Jun. 21, 1999).
Hamdi et al., "Voice Service Interworking for PSTN and IP Networks," IEEE Communications Magazine, p. 104-111, (Jun. 5, 1999).
Sprague et al., "Transport Adapter Layer Interface," Tekelec, p. 1-30, (May 28, 1999).
Lakshmi-Ratan, "The Lucent Technologies Softswitch-Realizing the Promise of Convergence," Bell Labs Technical Journal, p. 174-195, (Apr. 5, 1999).
Handley et al., "SIP: Session Initiation Protocol," Internet Draft, Network Working Group, pp. 1-141. (Mar. 1999).
Bressler, "SS7 Level Two Over IP," Nortel Networks, pp. 1-6 (Jan. 1999).
"Enterprise IP Gateway," Ericcson, pp. 1-6 (1999).
"The Ericsson IPT System," Ericsson, pp. 1-8 (1999).
PCS Access Network Requirements: Interface Specification, Interface: Service Access Socket System Interface (SASSI), Version 01.01, Dec. 3, 1998 (Unpublished).
PCS Access Network Requirements: Product Specification, Network Element: Gateway Signal Transfer Point between CCS/SS7 and TCP-IP Networks (GW-STP-IP), Dec. 3, 1998 (Unpublished).
Glaude et al., "SS7 to IP Signaling Gateway Transport Architecture", Internet Engineering Task Force, pp. 1-39 (Nov. 27, 1998).
Michael McGrew, "Transport SS7 Signaling Over IP," Lucent Technologies Inc., p. 1-8 (Nov. 1998).
Cuervo et al., "SSS-Internet Interworking—Architectural Framework," pp. 1-9 (Jul. 1998).
Tekelec, "Eagle® Feature Guide," PN/9110-1225-01, (Jan. 1998).
O'Shea, "The Network That's Never Done," Telephony, p. 38-43, (Sep. 15, 1997).
Tekelec, "Eagle® STP Platform," 908-0134-01, (1997).
Tekelec, "STP Lan Interface Feature," 908-0134-01, (1997).
Snyder, "Rerouting Internet Traffic Jams," Telephony, p. 12, (Nov. 11, 1996).
Anonymous, "Around the Loop," Telephony, p. 26, (Jul. 22, 1996).
Woods, "Fresno Bee Still Buzzing About Wireless," TechNews, pp. 1-2 (1995).
Bellcore, "Signaling Transfer Point (STP) Generic Requirements," GR-82-CORE, Issue 1 (Jun. 1994).
Yang et al., "The Design and Implementation of a Service Logic Execution Environment Platform," IEEE, pp. 1911-1917 (1993).
Almquist, "Type of Service in the Internet Protocol Suite," Internet Engineering Task Force RFC 1349, pp. 1-28. (Jul. 1992).
Zaharychuk et al., "Gateway Signal Transfer Points: Design, Services and Benefits,"IEEE, pp. 223.2.1-223.2.8, (May 29, 1990).
El-Toumi et al., "Interconnecting SS7 Signaling Networks," AT&T Bell Laboratories, IEEE, pp. 589-593 (1990).
Bootman et al., "Generic Building Blocks for the Telecommunications Management Network," IEEE, 6.1.1-6.1.5, (1988).
Buckles, "Very High Capacity Signaling Transfer Point For Intelligent Network Services," IEEE, p. 40.2.1-40.2.4, (1988).
Applicant-Initiated Interview Summary for U.S. Appl. No. 12/906,816 (Jan. 10, 2014).
Extended European Search Report for European Application No. 11742905.0 (Dec. 11, 2013).
Extended European Search Report for European Application No. 11742894.6 (Dec. 3, 2013).
Non-Final Office Action for U.S. Appl. No. 12/906,816 (Oct. 1, 2013).
Notice of Allowance and Fee(s) Due for U.S. Appl. No. 13/026,060 (Sep. 25, 2013).
Commony-Assigned, Co-Pending U.S. Continuation U.S. Appl. No. 14/016,000 titled "Methods, Systems, and Computer Readable Media for Answer-Based Routing of Diameter Request Messages," (unpublished, filed Aug. 30, 2013).
Non-Final Office Action for U.S. Appl. No. 13/026,125 (Aug. 30, 2013).
Non-Final Office Action for U.S. Appl. No. 13/026,133 (Aug. 19, 2013).
Notice of Allowance and Fee(s) Due for for U.S. Appl. No. 13/026,076 (Jun. 27, 2013).
Restriction Requirement for U.S. Appl. No. 13/026,125 (Jun. 11, 2013).
Notice of Allowance and Fee(s) Due for U.S. Appl. No. 13/026,081 (Jun. 5, 2013).
Notice of Allowance and Fee(s) Due for U.S. Appl. No. 13/026,031 (May 30, 2013).
Notice of Allowance and Fee(s) Due for U.S. Appl. No. 13/412,352 (May 28, 2013).
Interview Summary for U.S. Appl. No. 13/026,098 (May 23, 2013).
Final Office Action for U.S. Appl. No. 13/026,060 (May 10, 2013).
Notice of Allowance and Fee(s) Due for U.S. Appl. No. 13/026,144 (May 1, 2013).
Tsou et al., "Diameter Routing Extensions," draft-tsou-dime-base-routing-ext-04, Internet-Draft, pp. 1-28 (Jul. 29, 2008).
Ravikumar et al., "Star-Graph Based Multistage Interconnection Network for ATM Switch Fabric," Parallel and Distributed Processing, pp. 1-8 (Oct. 26, 1994).
Final Office Action for U.S. Appl. No. 13/465,464 (Feb. 6, 2014).
Non-Final Office Action for U.S. Appl. No. 12/183,414 (Dec. 9, 2013).
Notice of Panel Decision from Pre-Appeal Brief Review for U.S. Appl. No. 12/183,414 (Sep. 10, 2013).
Non-Final Office Action for U.S. Appl. No. 13/465,464 (Sep. 6, 2013).
Advisory Action for U.S. Appl. No. 12/183,414 (Jul. 1, 2013).
Final Office Action for U.S. Appl. No. 12/906,816 (Feb. 11, 2014).
Notice of Allowance and Fee(s) Due for U.S. Appl. No. 13/026,133 (Feb. 3, 2014).
Notice of Allowance and Fee(s) Due for U.S. Appl. No. 13/026,125 (Jan. 24, 2014).
Extended European Search Report for European Application No. 11742923.3 (Jan. 22, 2014).
Notice of Allowance and Fee(s) Due for U.S. Appl. No. 13/026,112 (Apr. 26, 2013).
Notice of Allowance and Fee(s) Due for U.S. Appl. No. 13/026,153 (Apr. 15, 2013).
Notice of Allowance and Fee(s) Due for U.S. Appl. No. 13/026,162 (Apr. 1, 2013).
Supplemental Notice of Allowability for U.S. Appl. No. 13/026,031 (Mar. 22, 2013).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).

(56) References Cited

OTHER PUBLICATIONS

Korhonen, "The Diameter Overload Control Application (DOCA)," Diameter Maintenance and Extension (DIME), Internet-Draft, draft-korhonen-dime-ovl-01.txt, pp. 1-18 (Feb. 25, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Final Office Action for U.S. Appl. No. 12/183,414 (Jan. 17, 2013).
Notice of Allowance and Fee(s) Due for U.S. Appl. No. 13/026,162 (Dec. 19, 2012).
Final Official Action for U.S. Appl. No. 13/026,076 (Dec. 7, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Non-Final Official Action for U.S. Appl. No. 13/026,153 (Nov. 6, 2012).
Non-Final Official Action for U.S. Appl. No. 13/412,352 (Oct. 26, 2012).
Communication of European Publication Number and Information on the Application of Article 67(3) EPC for European Patent Application No. 11742921.7 (Sep. 12, 2012).
Communication of European publication Number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Traffix Systems, "Datasheet; Traffix Signaling Delivery Controller (SDC)," pp. 1-5 (May 2011).
First Office Action for Chinese Patent Application No. 201180018670.0 (Jul. 14, 2014).
First Office Action for Chinese Patent Application No. 201180013555.4 (Jul. 3, 2014).
Office Action for Israel Patent Application No. 219214 (Jul. 2, 2014).
First Office Action for Chinese Patent Application No. 201180018952.0 (Jun. 26, 2014).
Non-Final Office Action for U.S. Appl. No. 12/906,816 (Jun. 19, 2014).
First Office Action for Chinese Patent Application No. 201180013381.1 (Jun. 5, 2014).
Applicant-Initiated Interview Summary for U.S. Appl. No. 12/906,816 (May 15, 2014).
First Office Action for Chinese Application No. 201180008578.6 (May 8, 2014).
Notice of Allowance and Fee(s) Due for U.S. Appl. No. 13/932,608 (Apr. 9, 2014).
First Office Action for Chinese Application No. 201080056996.8 (Apr. 4, 2014).
Non-Final Office Action for U.S. Appl. No. 14/016,000 (Mar. 28, 2014).
Office Action for Israel Patent Application No. 219214 (Mar. 3, 2014).
Commonly-Assigned, Co-Pending U.S. Appl. No. 14/185,438 titled "Methods Systems, and Computer Readable Media for Performing Diameter Answer Message-Based Network Management at a Diameter Signaling Router (DSR)," (unpublished, filed Feb. 20, 2014).
Final Office Action for U.S. Appl. No. 12/183,414 (Jun. 20, 2014).
Commonly-assigned, co-pending U.S. Appl. No. 14/302,093 titled Methods, Systems, and Computer Program Products for Organizing, Managing, and Selectively Distributing Routing Information in a Signaling Message Routing Node (Unpublished, filed Jun. 11, 2014).
Notice of Allowance and Fee(s) Due for U.S. Appl. No. 13/465,464 (May 14, 2014).
Applicant-Initiated Interview Summary for U.S. Appl. No. 13/465,464 (Apr. 22, 2014).

\* cited by examiner

US 9,088,478 B2

METHODS, SYSTEMS, AND COMPUTER READABLE MEDIA FOR INTER-MESSAGE PROCESSOR STATUS SHARING

PRIORITY CLAIM

This application claims the benefit of U.S. Provisional Patent Application Ser. No. 61/304,310, filed Feb. 12, 2010; the disclosure of which is incorporated herein by reference in its entirety.

STATEMENT OF INCORPORATION BY REFERENCE

The disclosures of each of the following commonly-owned, co-pending U.S. Patent Applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," 1322/399/8 (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to inter-message processor status sharing. More specifically, the subject matter relates to methods, systems, and computer readable media for inter-message processor status sharing.

BACKGROUND

The Diameter protocol is a next generation authentication, authorization, and accounting (AAA) protocol. The Diameter base protocol is defined in IETF RFC 3588, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

The above-referenced Diameter RFC does not specify an architecture for Diameter routing or processing nodes. Likewise, the RFC does not specify a method for inter-processor communication when a Diameter element includes a distributed architecture. Accordingly, a need exists for methods, systems, and computer readable media for inter-message processor status sharing.

SUMMARY

According to one aspect, the subject matter described herein includes a method of operating a Diameter signaling router (DSR) for routing Diameter messages. The method includes steps occurring at a DSR comprising a plurality of Diameter message processors, each configured to perform at least one Diameter function. The method also includes detecting, at a first of the plurality of Diameter message processors, a change in status associated with the at least one Diameter function. The method further includes communicating, by the first of the plurality of Diameter message processors and to a second of the plurality of Diameter message processors, an indication of the change in status.

According to another aspect, the subject matter described herein includes a system for routing Diameter messages. The system includes a Diameter signaling router including first and second Diameter message processors, each configured to implement at least one Diameter function. The first Diameter message processor is configured to detect a change in status associated with the at least one Diameter function and communicate, to the second Diameter message processor, an indication of the change in status.

As used herein, the term "Diameter connection layer (DCL)" refers to a layer of the Diameter stack that implements Diameter transport connections.

As used herein, the term "Diameter routing layer (DRL)" refers to a layer of the Diameter stack which implements Diameter routing.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Methods, systems, and computer readable media for inter-MP status sharing are provided.

A DSR may be any suitable entity for routing or relaying Diameter signaling messages between Diameter nodes. For example, a DSR may be a long term evolution (LTE) signaling router, an LTE Diameter signaling router, a Diameter signaling agent, a Diameter proxy agent, a Diameter relay agent, a Diameter routing agent, a Diameter translation agent, or a Diameter redirect agent. A DSR may include functionality for processing various messages. In one embodiment, a DSR may communicate with various Diameter nodes via one or more 3rd generation partnership project (3GPP) LTE communications interfaces. In another embodiment, a DSR may communicate with various Diameter nodes via one or more other (e.g., non-LTE) communications interfaces. For example, a DSR may communicate with Internet protocol (IP) multimedia subsystem (IMS) nodes, such as call session control functions (CSCFs), using IMS-related interfaces.

In one embodiment, a DSR may include multiple MPs, where each MP is a distinct message processing module of a distributed computing platform, a computing blade in a blade-based distributed computing platform, a processing core element associated with a single or multi-core computing device, or a virtual node instantiated on a single physical message processing/computing device. As such, a DSR may be located in a single distinct geographic location and communicate via an internal communications network, or may include multiple MPs located in geographically diverse locations and communicating via an external communications network.

As a logical entity, a DSR is extremely scalable, and may be designed according to multiple architectural options. A first architecture option may include where each MP supports a full Diameter stack that includes a DCL, a DRL, and an application layer. A second architecture option may include a DCL that runs on dedicated MPs, with routing and application layers either combined on MPs or each having dedicated MPs. A third architecture option may include a Diameter stack (DCL/DRL) that runs on dedicated MPs, with local Diameter applications running on separate dedicated MPs. Each of these exemplary architecture options will now be described in greater detail below with respect to FIGS. 1, 2, and 3.

Figure 1:
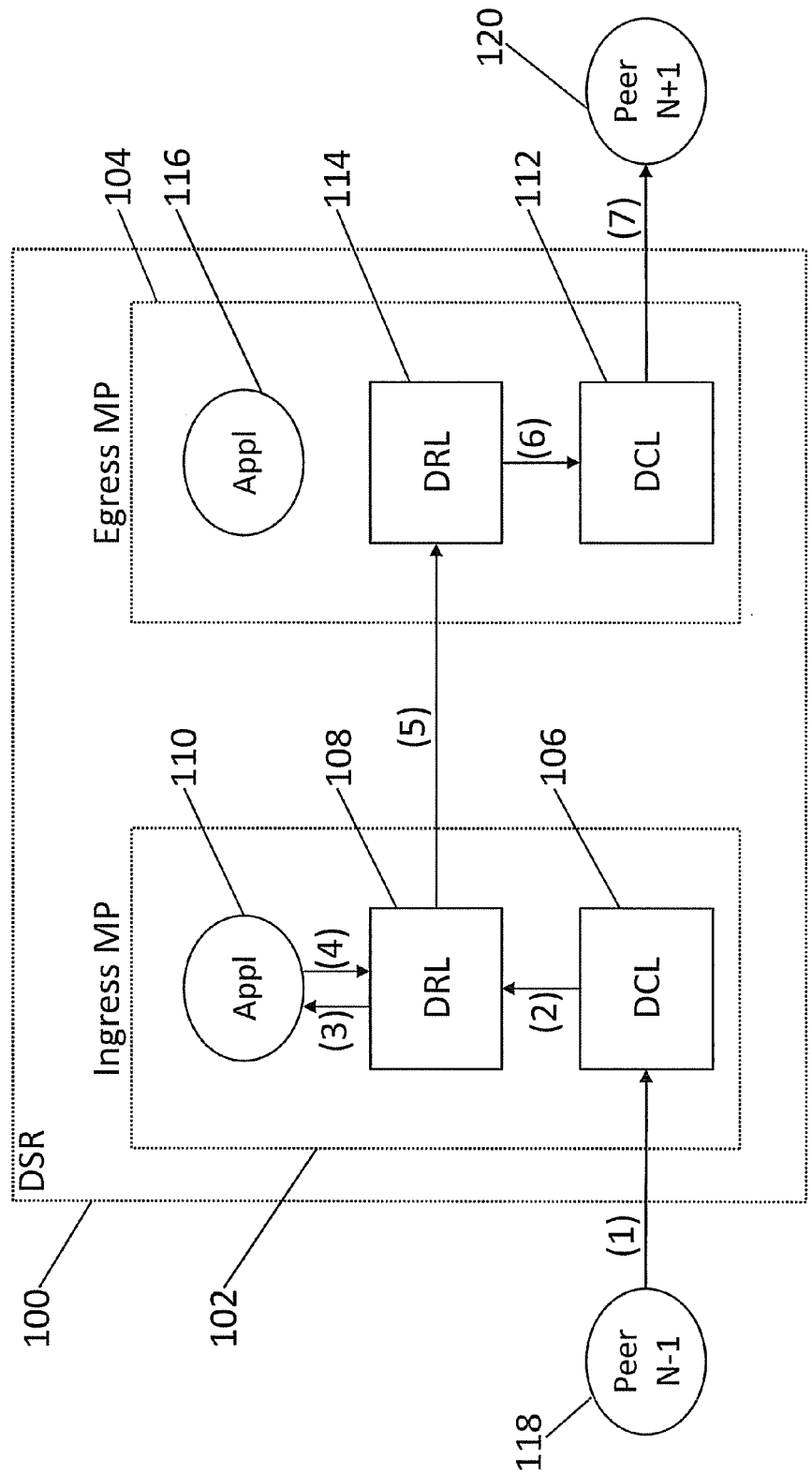
FIG. 1 is a block diagram illustrating an exemplary DSR architecture including full stack message processors (MPs) for routing Diameter messages according to an embodiment of the subject matter described herein.

FIG. 1 is a block diagram illustrating an exemplary DSR architecture including full stack MPs for routing Diameter messages according to an embodiment of the subject matter described herein. Referring to FIG. 1, DSR 100 may include ingress MP 102 for receiving Diameter messages from peers and egress MP 104 for transmitting Diameter messages to peers. Ingress MP 102 and egress MP 104 may each include a DCL, DRL, and one or more applications. For example, ingress MP 102 may include DCL 106, DRL 108, and application 110. Likewise, egress MP 104 may include DCL 112, DRL 114, and application 116. In order to communicate between ingress MP 102 and egress MP 104, DRL 108 of ingress MP 102 may be operable to communicate with DRL 114 and DCL 112 of egress MP 104. Additionally, DRLs 108 and 114 may each be operable to communicate with DCLs 106 and 112 and applications 110 and 116, respectively.

In an exemplary Diameter message routing scenario, peer N−1 118 may send a Diameter message to DSR 100. The Diameter message may be received by DCL 106 of ingress MP 102. Ingress messages may be processed completely on ingress MP 102 up through the selection of a next-hop peer for the Diameter message by DRL 108. Continuing the exemplary scenario above, DCL 106 may pass the Diameter message to DRL 108.

If application processing is required, ingress DRL 108 may forward the Diameter message to a Diameter message processor hosting a local application(s). For example, DRL 108 may forward the Diameter message to an MP hosting local application 110, which processes the message and returns the message to DRL 108. It is appreciated that the application distribution function may not be required.

Next, ingress DRL 108 may forward the Diameter message to egress DRL 114 for forwarding to the local DCL queue 112. Egress DCL 112 may then transmit the Diameter message to peer N+1 120.

In an additional exemplary Diameter message routing scenario (not illustrated), peer N−1 118 may send a Diameter message to DSR 100. The Diameter message may be received by DCL 106 of ingress MP 102. DCL 106 may forward the message to DRL 108. If application processing is required, ingress DRL 108 may forward the Diameter message to local application 110, which processes the message and returns the message to DRL 108. Next, ingress DRL 108 may forward the Diameter message to egress DCL 112, which may then transmit the Diameter message to peer N+1 120.

In an additional exemplary Diameter message routing scenario (not illustrated), peer N−1 118 may send a Diameter message to DSR 100. The Diameter message may be received by DCL 106 of ingress MP 102. DCL 106 may pass the Diameter message to DRL 114 of egress MP 104. If application processing is required, egress DRL 114 may forward the Diameter message to local application 116, which processes the message and returns the message to DRL 114. Next, egress DRL 114 may forward the Diameter message to egress DCL 112, which may then transmit the Diameter message to peer N+1 120.

Figure 2:
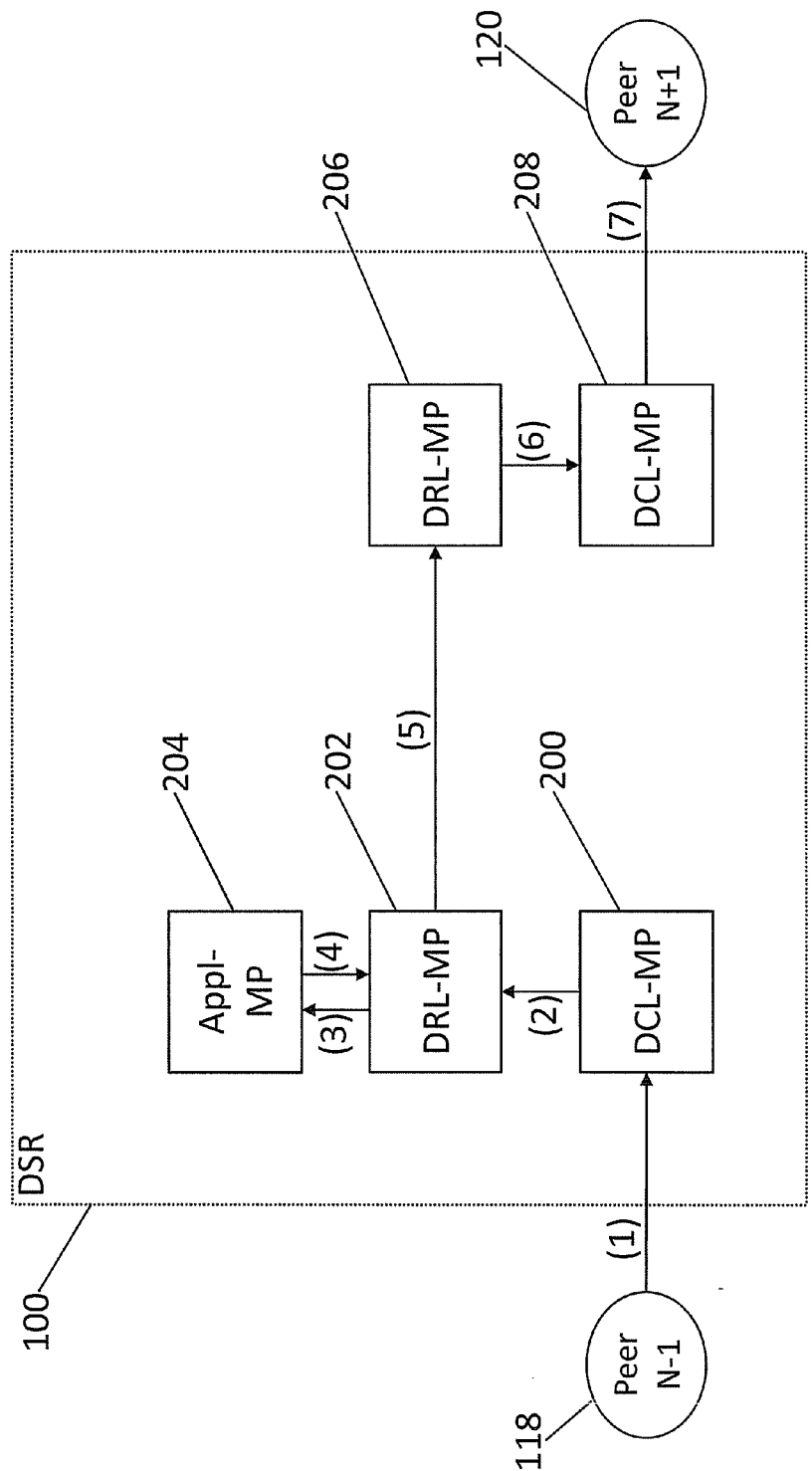
FIG. 2 is a block diagram illustrating an exemplary DSR architecture including dedicated Diameter connection layer (DCL) MPs for routing Diameter messages according to an embodiment of the subject matter described herein.

FIG. 2 is a block diagram illustrating an exemplary DSR architecture including dedicated Diameter connection layer DCL MPs for routing Diameter messages according to an embodiment of the subject matter described herein. In contrast to the full stack-per MP embodiment shown in FIG. 1, the embodiment shown in FIG. 2 includes dedicated DCL MPs. Referring to FIG. 2, DSR 100 may include DCL-MP 200 for receiving Diameter messages from peers and DCL-MP 208 for transmitting Diameter messages to peers. Similarly, DSR 100 may include DRL-MP 202 and DRL-MP 206 for receiving Diameter messages from peers and for transmitting Diameter messages to peers. In contrast to a full stack-per MP embodiment (FIG. 1), application-MP 204 may be associated with DRL-MP 202 and may not have a corollary associated with DRL-MP 206. Nevertheless, application-MP 204 may be operable to communicate with either or both of DRL-MPs 202 and 206. Like FIG. 1, DRL-MPs 202 and 206 may each be operable to communicate with one another and with DCL-MPs 200 and 208.

Therefore, in an exemplary Diameter message routing scenario analogous to the one described above with respect to FIG. 1, peer N−1 118 may send Diameter messages to DSR 100. Ingress Diameter messages may be received by DCL-MP 200, which may distribute the Diameter messages (e.g., request messages) to DRL-MP 202 based on various factors including, but not limited to, the availability, transactions per second (TPS) capacity, and congestion status of DRL-MP 202 as compared with other DRL-MPs (not shown in their entirety).

DRL-MP 202 may determine whether application processing is required. If application processing is required, ingress DRL-MP 202 may distribute the request messages to Appl-MP 204 (also based on its availability, TPS capacity, and congestion status).

Ingress DRL-MP 202 may then select a next-hop peer for the messages and ingress DRL-MP 202 may forward the messages to egress DRL-MP 206. Egress DRL-MP 206 may then forward the messages to egress DCL-MP 208 (highest degree on inter-MP communication) for delivery to peer N+1 120 selected by DRL-MP 202.

In an additional exemplary Diameter message routing scenario (not illustrated), peer N−1 118 may send Diameter messages to DSR 100. Ingress Diameter messages may be received by DCL-MP 200, which may distribute the Diameter messages (e.g., request messages) to DRL-MP 202 based on various factors including, but not limited to, the availability, TPS capacity, and congestion status of DRL-MP 202 as compared with other DRL-MPs (not shown in their entirety). DRL-MP 202 may determine whether application processing is required. If application processing is required, ingress DRL-MP 202 may distribute the request messages to Appl-MP 204 (also based on its availability, TPS capacity, and congestion status). Ingress DRL-MP 202 may then select a next-hop peer for the messages and ingress DRL-MP 202 may forward the messages to egress DCL-MP 208 for delivery to peer N+1 120 selected by DRL-MP 202.

In an additional exemplary Diameter message routing scenario (not illustrated), peer N−1 118 may send Diameter messages to DSR 100. Ingress Diameter messages may be received by DCL-MP 200, which may distribute the Diameter messages (e.g., request messages) to DRL-MP 206 based on various factors including, but not limited to, the availability, TPS capacity, and congestion status of DRL-MP 206 as compared with other DRL-MPs (not shown in their entirety). DRL-MP 206 may determine whether application processing is required. If application processing is required, DRL-MP 206 may distribute the request messages to Appl-MP 204 (also based on its availability, TPS capacity, and congestion status). DRL-MP 206 may then select a next-hop peer for the messages and DRL-MP 206 may forward the messages to egress DCL-MP 208 for delivery to peer N+1 120 selected by DRL-MP 206.

Figure 3:
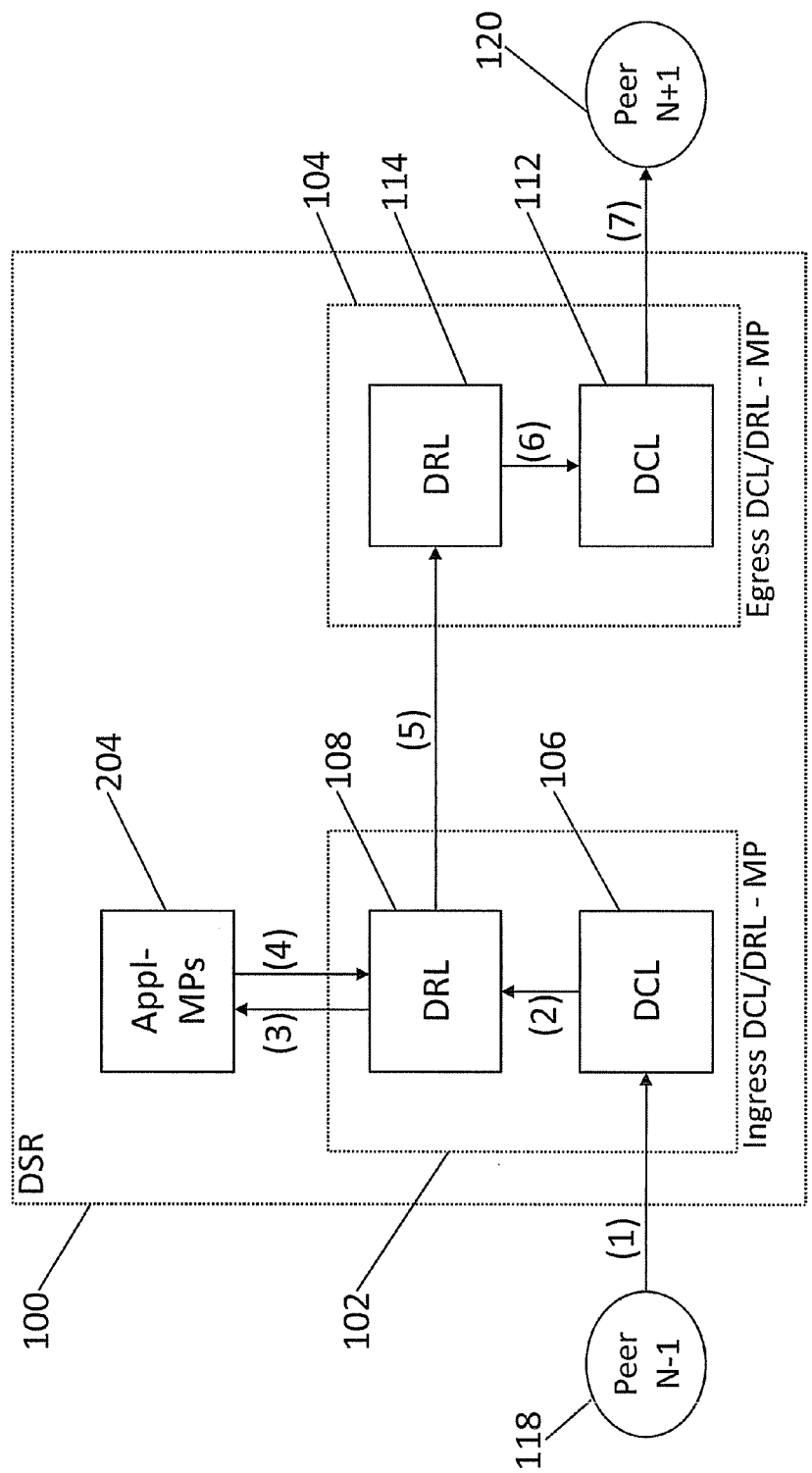
FIG. 3 is a block diagram illustrating an exemplary DSR architecture including dedicated DCL/DRL and application MPs for routing Diameter messages according to an embodiment of the subject matter described herein.

FIG. 3 is a block diagram illustrating an exemplary DSR architecture including dedicated DCL/DRL and application MPs for routing Diameter messages according to an embodiment of the subject matter described herein. It may be appreciated that FIG. 3 represents a hybrid approach between the full stack per MP of FIG. 1 and the dedicated DCL/DRL/application-MPs of FIG. 2. Referring to FIG. 3, in an exemplary Diameter message routing scenario, peer N−1 118 may send a Diameter message to DSR 100. The Diameter message may be received by DCL 106 of ingress MP 102. The Diameter message may be processed completely on ingress MP 102 up through the selection of a destination peer for the Diameter message by DRL 108. DCL 106 may then pass the Diameter message to DRL 108.

If application processing is required, ingress DRL 108 may forward the Diameter message to local application(s). For example, DRL 108 may forward the Diameter message to local application 204, which may process the message and return the message to DRL 108.

Next, ingress DRL 108 may forward the Diameter message to egress DRL 114 for forwarding to the local DCL queue 112. Egress DCL 112 may then transmit the Diameter message to peer N+1 120.

In an additional exemplary Diameter message routing scenario (not illustrated), peer N−1 118 may send a Diameter message to DSR 100. The Diameter message may be received by DCL 106 of ingress MP 102. The Diameter message may be processed completely on ingress MP 102 up through the selection of a destination peer for the Diameter message by DRL 108. DCL 106 may then pass the Diameter message to DRL 108. If application processing is required, ingress DRL 108 may forward the Diameter message to local application(s). For example, DRL 108 may forward the Diameter message to local application 204, which may process the message and return the message to DRL 108. Next, ingress DRL 108 may forward the Diameter message to DCL 112 which may then transmit the Diameter message to peer N+1 120.

In an additional exemplary Diameter message routing scenario (not illustrated), peer N−1 118 may send a Diameter message to DSR 100. The Diameter message may be received by DCL 106 of ingress MP 102. DCL 106 may then pass the Diameter message to DRL 114. If application processing is required, DRL 114 may forward the Diameter message to local application(s). For example, DRL 114 may forward the Diameter message to local application 204, which may process the message and return the message to DRL 114. Next, DRL 114 may forward the Diameter message to DCL 112 which may then transmit the Diameter message to peer N+1 120.

Figure 4:
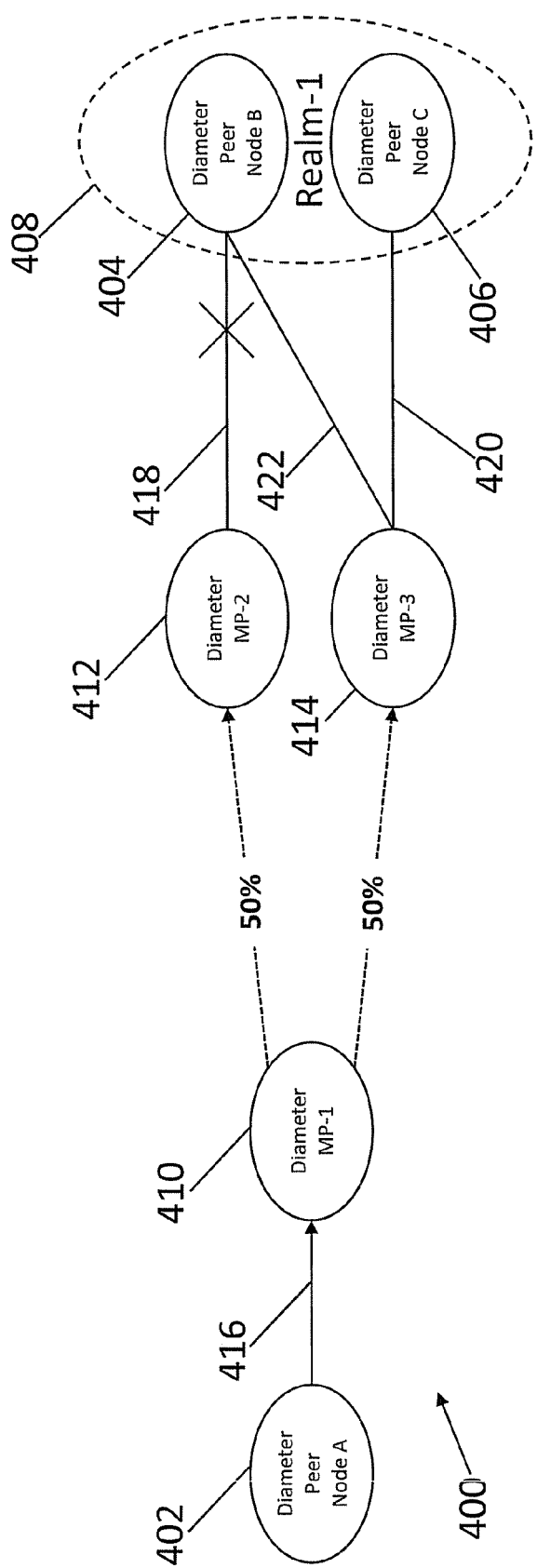
FIG. 4 is a network diagram illustrating an exemplary Diameter networking environment which implements independent Diameter message processing nodes for routing Diameter messages between Diameter nodes and does not utilize inter-MP status sharing.
Figure 5:
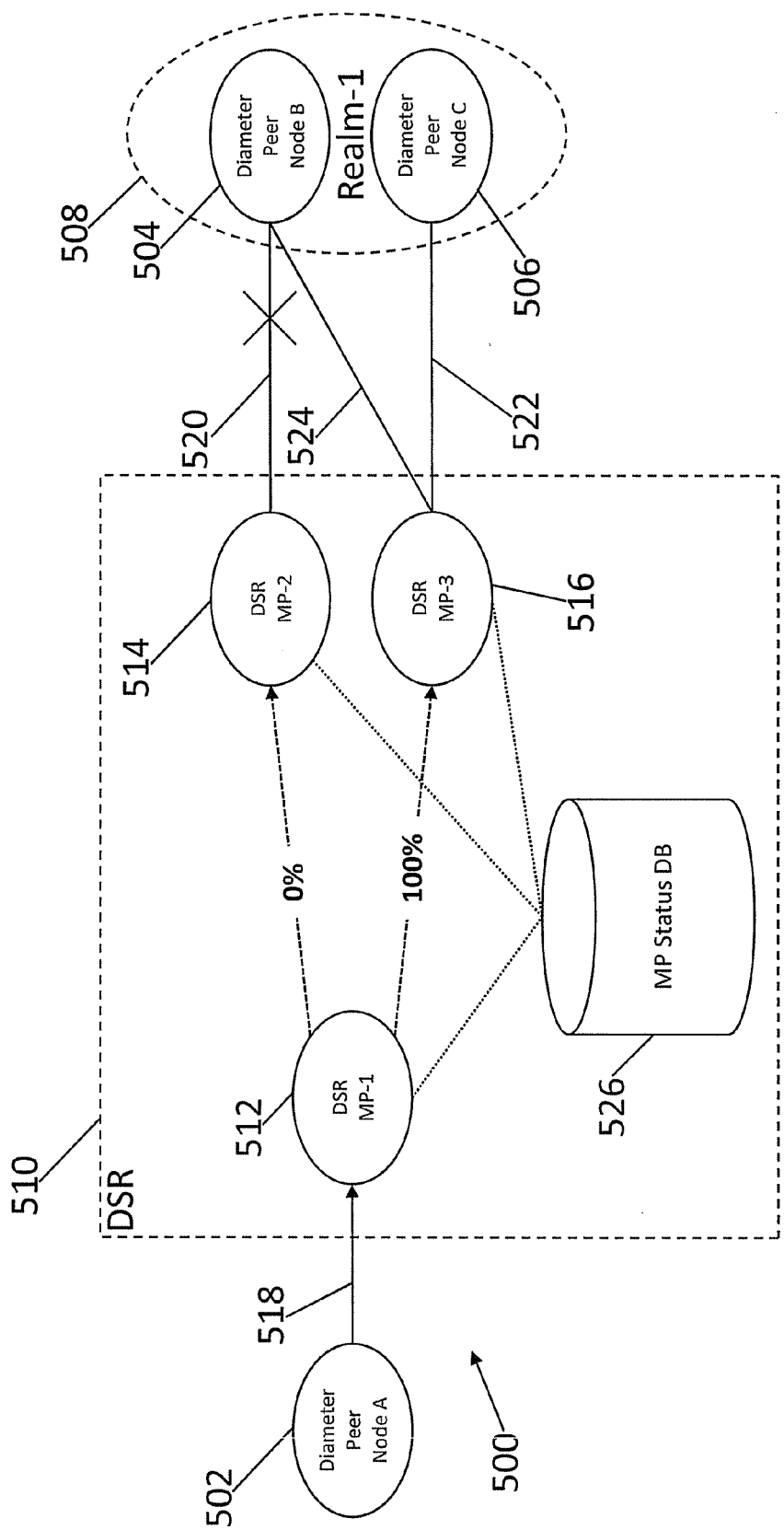
FIG. 5 is a network diagram illustrating an exemplary network that includes a DSR which includes multiple MPs for routing Diameter messages utilizing inter-message processor status sharing according to an embodiment of the subject matter described herein.

Irrespective of the architectural option implemented, utilization of a DSR may benefit from the ability of the individual MPs to share change in their respective statuses. Exemplary MP status information may include, but is not limited to, status information associated with one or more Diameter connections hosted/serviced by the MP, status information associated with one or more Diameter signaling routes serviced by the MP, status information associated with one or more SCTP associations hosted/serviced by the MP, status information associated with one or more Diameter peer nodes serviced by/accessed via the MP, status information associated with one or more TCP sockets hosted/serviced by the MP, status information associated with one or more Internet protocol addresses hosted/serviced by the MP, status information associated with one or more database resources hosted/serviced by the MP, and status information associated with one or more Diameter applications hosted by/serviced by/accessed via the MP. Exemplary types of status information may include, but are not limited to, availability status information, congestion status information, active/standby status information, in-service/out-of-service status information, failure state status information, software version status information, hardware version status information, firmware version status information, upgrade status information, message processing/transaction rate status information. The sharing of such "peer status" may, for example, be utilized by the ingress MP to determine the status of route lists, route groups, and routes which are prerequisite to route selection. In other embodiments a local MP may share its congestion status in order to aide its peers in routing. For example, if an egress MP is experiencing critical congestion, inter-MP status sharing may allow ingress MP to take this into consideration during route selection. FIGS. 4 and 5 illustrate an exemplary benefit of utilizing inter-MP status sharing in such a scenario.

FIG. 4 is a network diagram illustrating an exemplary Diameter networking environment which implements independent Diameter message processing nodes for routing Diameter messages between Diameter nodes and does not utilize inter-MP status sharing. Referring to FIG. 4, network 400 includes Diameter peer nodes 402, 404, and 406. Diameter peer nodes 404 and 406 are in a common Diameter realm 408. Network 400, further includes independent Diameter message processing nodes 410, 412, and 414. A Diameter connection 416 exists between Diameter peer node 402 and Diameter message processing node 410. Similarly, Diameter connection 418 exists between Diameter peer node 404 and Diameter message processing node 412; Diameter connection 420 exists between Diameter peer node 406 and Diameter message processing node 414; and Diameter connection 422 exists between Diameter peer node 404 and Diameter message processing node 414.

As FIG. 4 illustrates, Diameter messaging processing node 410 is load sharing messages coming from Diameter peer node 402 and destined for Diameter realm 408 between Diameter message processing nodes 412 and 414 at a 50/50 ratio. A route failure exists along Diameter connection 418. While Diameter message processing node 412 may be aware of the route failure along Diameter connection 418, Diameter message processing node 410 remains unaware. Without knowledge of the route failure along Diameter connection 418, Diameter message processing node 410 continues to load share half of the messages from Diameter peer node 402 and destined for Diameter realm 408 to Diameter message processing node 412. Operating network 400 in such a manner results in half of the routing attempts performed by Diameter message processing node 410 failing and having to be rerouted.

FIG. 5 is a network diagram illustrating an exemplary network that includes a DSR which includes multiple MPs for routing Diameter messages utilizing inter-MP status sharing according to an embodiment of the subject matter described herein. Referring to FIG. 5, network 500 includes Diameter peer nodes 502, 504, and 506. Diameter peer nodes 504 and 506 are in a common Diameter realm 508. Network 500, further includes DSR 510. DSR 510 may include multiple Diameter message processors. For example, DSR 510 includes Diameter message processors 512, 514, and 516. A Diameter connection 518 exists between Diameter peer node 502 and DSR 510's Diameter MP 512. Similarly, Diameter connection 520 exists between Diameter peer node 504 and DSR 510's Diameter MP 514; Diameter connection 522 exists between Diameter peer node 506 and DSR 510's Diameter MP 516; and Diameter connection 524 exists between Diameter peer node 504 and DSR 510's Diameter MP 516.

As FIG. 5 illustrates, DSR 510's Diameter MP 512W may load share messages coming from Diameter peer node 502 and destined for Diameter realm 508 between DSR 510's Diameter MPs 514 and 516. Prior to a route failure along Diameter connection 520, this load sharing may be at a 50/50 ratio (not illustrated). A route failure may arise along Diameter connection 520. In accordance with an embodiment of the subject matter described herein, DSR 510's Diameter MP 514 may share information pertaining to its status (e.g., route failure exists along Diameter connection 520) with its peer, DSR 510's Diameter MP 512. In response, DSR 510's Diameter MP 512 may alter the load sharing ratio to 0/100 so that all Diameter messages from Diameter peer node 502 and destined for Diameter realm 508 are routed through DSR 510's MP 516. Similarly, if and when the route failure along Diameter connection 520 is resolved, DSR 510's MP 514 may share information pertaining to its status (e.g., Diameter connection 520 "up") with its peer, DSR 510's Diameter MP 512, which may then resume load sharing messages coming from Diameter peer node 502 and destined for Diameter realm 508 between DSR 510's Diameter MPs 514 and 516 at a 50/50 ratio (not illustrated). In an alternate example, when Diameter connection 520 fails, DSR 510's MP 512 may, upon learning of the change in status, redirect messages destined for Diameter peer node 504 to DSR 510's MP 516.

In one embodiment, DSR 510 may include MP status database (DB) 526. MP status DB 526 may be accessible to DSR 510's Diameter MPs 512, 514, and 516. In accordance with an embodiment of the subject matter described herein, MP status DB 526 may be utilized for inter-MP status sharing. For example, in the above scenario, DSR 510's Diameter MP 514 may update MP status DB 526 to reflect the route failure along Diameter connection 520. DSR 510's Diameter MP 512 may be configured to query MP status DB 526 and/or MP status DB 526 may be configured to broadcast/multicast status information to any or all of DSR 510's Diameter MPs.

Figure 6:
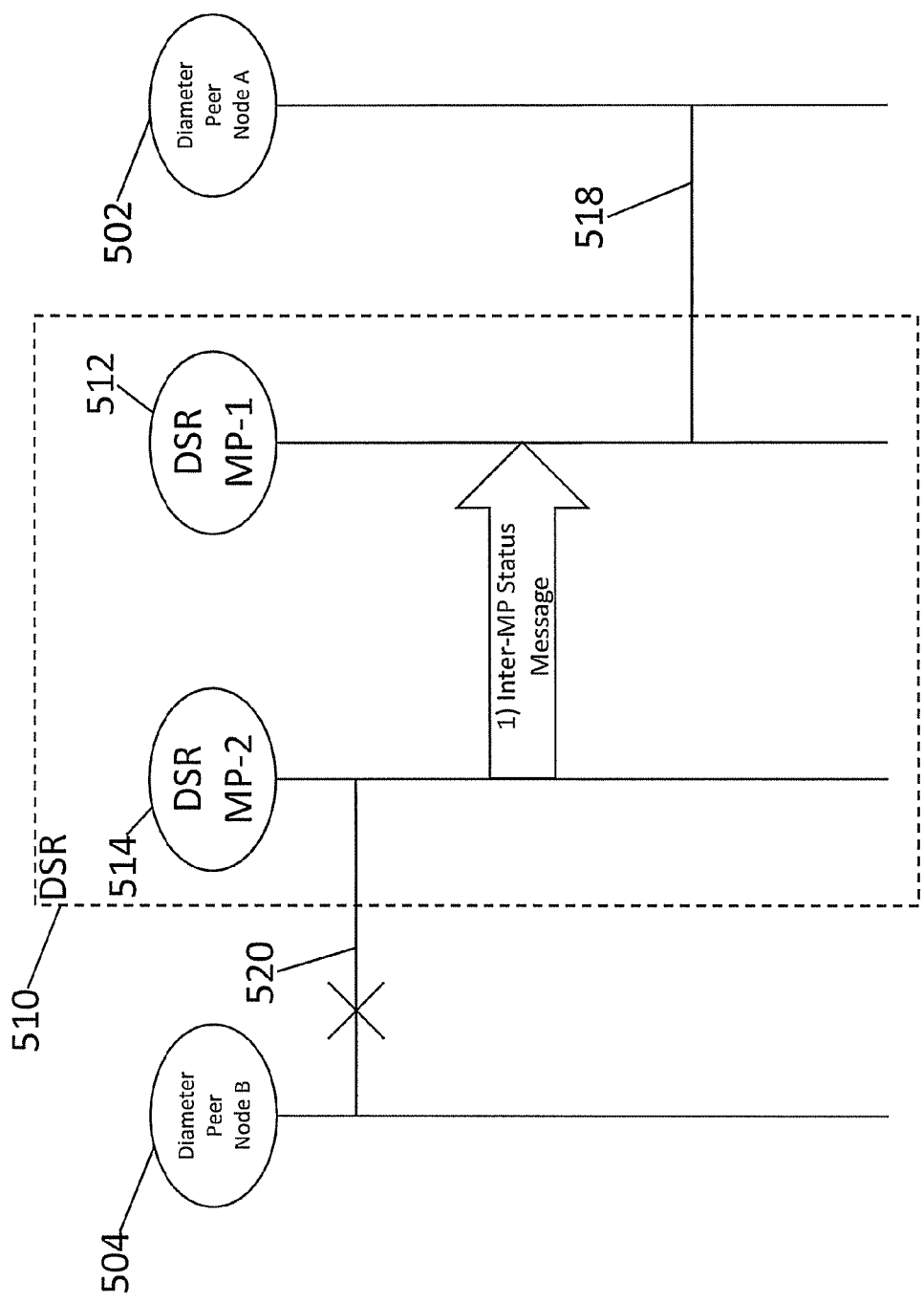
FIG. 6 is a message flow diagram illustrating inter-MP status sharing according to an embodiment of the subject matter described herein.

FIG. 6 is a message flow diagram illustrating inter-MP status sharing according to an embodiment of the subject matter described herein. Referring to the route failure scenario described above with respect to FIG. 5, DSR 510's Diameter MP 512 is load sharing messages coming from Diameter peer node 502 and destined for Diameter realm 508 between DSR 510's Diameter MPs 514 and 516 at a 50/50 ratio. Referring to FIG. 6, just prior to step 1, the route failure occurs along Diameter connection 520. DSR 510's Diameter MP 514 detects the route failure along Diameter connection 520. At step 1, DSR 510's Diameter MP 514 sends an inter-MP status message to its peer, DSR 510's Diameter MP 512, communicating the change in its status as a result of the failure along Diameter connection 520.

Figure 7:
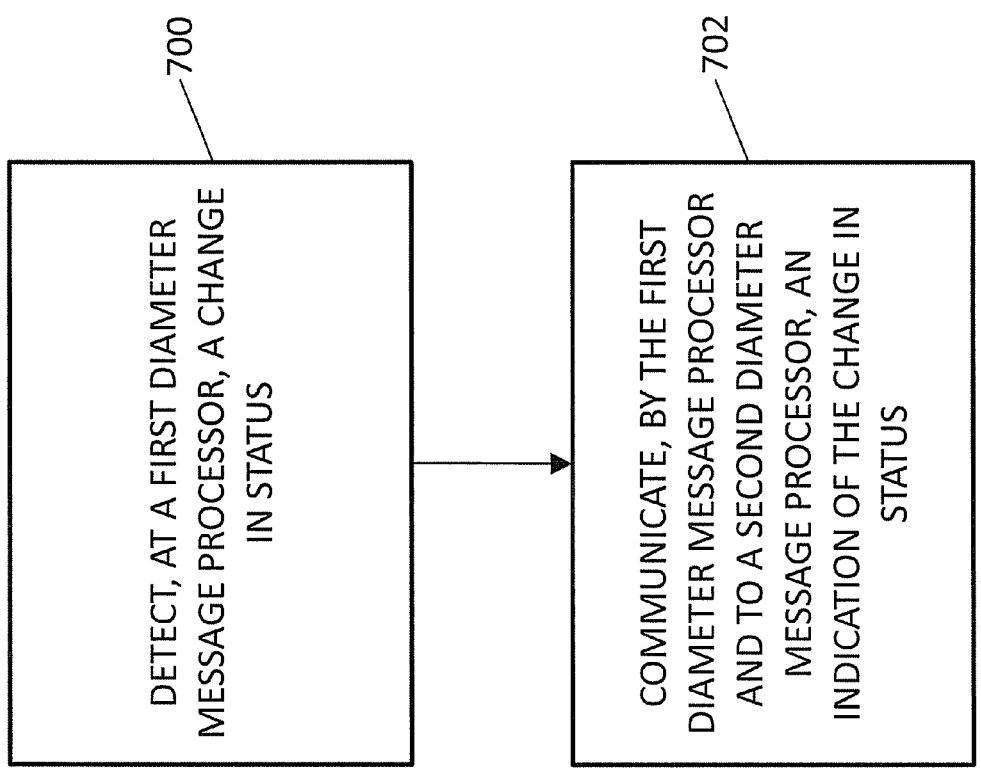
FIG. 7 is a flow chart illustrating an exemplary process for operating a DSR for routing Diameter messages according to an embodiment of the subject matter described herein.

FIG. 7 is a flow chart illustrating an exemplary process for operating a DSR for routing Diameter messages according to an embodiment of the subject matter described herein. Referring to FIG. 7, in step 700, a first Diameter message processor detects a change in status relating to a Diameter function performed by the Diameter message processor. For example, as set forth above, the first Diameter message processor may perform Diameter routing and may detect a change in status of a peer Diameter node or a connection that affects a Diameter route. In step 702, the first Diameter message processor communicates an indication of the change in status to a second Diameter message processor. For example, the first Diameter message processor may send a message to the second Diameter message processor communicating the identity of the affected route and the route status to the second Diameter message processor. In an alternate implementation, the first Diameter message processor may update a central routing table or other data structure indicating the change in status.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method of operating a Diameter signaling router (DSR) for routing Diameter messages, the method comprising:

at a DSR comprising a plurality of peer Diameter message processors, each configured to perform at least one Diameter function of a Diameter protocol:

detecting, at a first peer Diameter message processor of the plurality of peer Diameter message processors, a change in an ability of the first peer Diameter message processor to perform the at least one Diameter function on a first Diameter message received by the DSR, wherein the change in the ability of the first peer Diameter message processor to perform the at least one Diameter function comprises a change in the ability of the first peer Diameter message processor to process the first Diameter message;

communicating, by the first of the plurality of Diameter message processors and to a second of the plurality of Diameter message processors, an indication of the change in the ability of the first Diameter message processor to perform the at least one Diameter function, wherein communicating an indication of the change in the ability of the first peer Diameter message processor to perform the at least one Diameter function comprises updating at least one of a message processor status database associated with the DSR, a message processor status table associated with the DSR, and a message processor status data structure associated with the DSR, wherein at least one of the plurality of peer Diameter message processors is configured to query the at least one of the message processor status database associated with the DSR, the message processor status table associated with the DSR, and the message processor status data structure associated with the DSR;

selecting, at the second peer Diameter message processor and based at least in part on the indication of the change in the ability of the first peer Diameter message processor, a third peer Diameter message processor of the plurality of peer Diameter message processors to perform the at least one Diameter function on the first Diameter message, wherein the second peer Diameter message processor is configured to route, using the indication of the change in ability of the first peer Diameter message processor, the first Diameter message to one or more of the plurality of peer Diameter message processors in the DSR capable of processing the Diameter message; and sending the first Diameter message to the third peer Diameter message processor.

2. The method of claim 1 wherein the change in the ability of the first peer Diameter message processor to perform the at least one Diameter function further includes at least one of: an operational status of a message processor, an operational status of a Diameter layer, and an operational status of a Diameter application, a change in operational status of a Diameter peer node, a change in connection status of a Diameter peer node, and a change in connection status of a Diameter application.

3. The method of claim 1 comprising, in response to detecting the change in the ability of the first peer Diameter message processor to perform the at least one Diameter function, updating at least one of a routing table associated with the DSR, a routing database associated with the DSR, and a routing data structure associated with the DSR.

4. The method of claim 1 wherein at least one of the plurality of peer Diameter message processors is a distinct message processor for one of: implementing Diameter transport connections; implementing Diameter routing; or implementing Diameter applications.

5. The method of claim 1 wherein at least one of the plurality of peer Diameter message processors implements a layer for providing transport connections and a layer for performing Diameter routing.

6. The method of claim 1 wherein at least one of the plurality of peer Diameter message processors implements a layer for implementing transport connections, a layer for performing Diameter routing, and a layer for providing Diameter applications.

7. The method of claim 1 wherein the plurality of peer Diameter message processors are interconnected via either an internal communications network or an external communications network.

8. The method of claim 1 wherein at least one of the plurality of peer Diameter message processors comprises one of:

a distinct message processing module of a distributed computing platform;

a computing blade in a blade-based distributed computing platform;

a processing core element associated with a single or multi-core computing device; and a virtual node instantiated on a single physical message processing / computing device.

9. The method of claim 1 wherein communicating the indication of the change in the ability of the first peer Diameter message processor to perform the at least one Diameter function comprises sending broadcast/multicast status information to at least one of the plurality of peer Diameter message processors.

10. A system for routing Diameter messages, the system comprising:

a Diameter signaling router including:

first, second, and third peer Diameter message processors, each for implementing at least one Diameter function of a Diameter protocol, wherein the first peer Diameter message processor is configured to detect a change in an ability of the first peer Diameter message processor to perform the at least one Diameter function on a first Diameter message received by the DSR, wherein the change in the ability of the first peer Diameter message processor to perform the at least one Diameter function comprises a change in the ability of the first peer Diameter message processor to process the first Diameter message, and communicate, to the second peer Diameter message processor, an indication of the change in the ability of the first Diameter message processor to perform the at least one Diameter function, wherein the first peer Diameter message processor is configured to communicate the indication of the change in the ability of the first peer Diameter message processor to perform the at least one Diameter function by updating at least one of a message processor status database associated with the DSR, a message processor status table associated with the DSR, and a message processor status data structure associated with the DSR, wherein at least one of the first peer Diameter message processor and the second peer Diameter message processor is configured to query the at least one of the message processor status database associated with the DSR, the message processor status table associated with the DSR, and the message processor status data structure associated with the DSR, and wherein the second peer Diameter message processor is configured to select, based at least in part on the indication of the change in the ability of the first peer Diameter message processor, the third peer Diameter message processor to perform the at least one Diameter function on the first Diameter message and send the first Diameter message to the third peer Diameter message processor, wherein the second peer Diameter message processor is configured to route, using the indication of the change in the ability of the first peer Diameter message processor, the first Diameter message to one or more of the plurality of peer Diameter message processors in the DSR capable of processing the Diameter message.

11. The system of claim 10 wherein the change in the ability of the first peer Diameter message processor to perform the at least one Diameter function further includes at least one of: an operational status of a message processor, an operational status of a Diameter layer, and an operational status of a Diameter application, a change in operational status of a Diameter peer node, a change in connection status of a Diameter peer node, and a change in connection status of a Diameter application.

12. The system of claim 10 wherein at least one of the first and second peer Diameter message processors is configured to, in response to the change in the ability of the first peer Diameter message processor to perform the at least one Diameter function, update at least one of a routing table associated with the DSR, a routing database associated with the DSR, and a routing data structure associated with the DSR.

13. The system of claim 10 wherein at least one of the first peer Diameter message processor and the second peer Diameter message processor is a distinct message processor for one of: implementing Diameter transport connections; implementing Diameter routing; or implementing Diameter applications.

14. The system of claim 10 wherein at least one of the first peer Diameter message processor and the second peer Diameter message processor implements a layer for providing transport connections and a layer for performing Diameter routing.

15. The system of claim 10 wherein at least one of the first peer Diameter message processor and the second Diameter message peer processor implements a layer for providing transport connections, a layer for performing Diameter routing, and a layer for providing Diameter applications.

16. The system of claim 10 wherein the first peer Diameter message processor and the second peer Diameter message processor are interconnected via either an internal communications network or an external communications network.

17. The system of claim 10 wherein at least one of the first peer Diameter message processor and the second peer Diameter message processor comprises one of:
  a distinct message processing module of a distributed computing platform;
  a computing blade in a blade-based distributed computing platform;
  a processing core element associated with a single or multi-core computing device; and
  a virtual node instantiated on a single physical message processing / computing device.

18. The system of claim 10 wherein communicating the indication of the change in the ability of the first peer Diameter message processor to perform the at least one Diameter function comprises sending broadcast/multicast status information to at least one of the first peer Diameter message processor and the second peer Diameter message processor.

19. A non-transitory computer readable medium comprising computer executable instructions that when executed by a processor of a computer control the computer to perform steps comprising:
  at a DSR comprising a plurality of peer Diameter message processors, each configured to perform at least one Diameter function of a Diameter protocol:
    detecting, at a first peer Diameter message processor of the plurality of peer Diameter message processors, a change in an ability of the first peer Diameter message processor to perform the at least one Diameter function on a first Diameter message received by the DSR, wherein the change in the ability of the first peer Diameter message processor to perform the at least one Diameter function comprises a change in the ability of the first peer Diameter message processor to process the first Diameter message;
    communicating, by the first of the plurality of Diameter message processors and to a second of the plurality of Diameter message processors, an indication of the change in the ability of the first Diameter message processor to perform the at least one Diameter function, wherein communicating an indication of the change in the ability of the first peer Diameter message processor to perform the at least one Diameter function comprises updating at least one of a message processor status database associated with the DSR, a message processor status table associated with the DSR, and a message processor status data structure associated with the DSR, wherein at least one of the plurality of peer Diameter message processors is configured to query the at least one of the message processor status database associated with the DSR, the message processor status table associated with the DSR, and the message processor status data structure associated with the DSR;
    selecting, at the second peer Diameter message processor and based at least in part on the indication of the change in the ability of the first peer Diameter message processor, a third peer Diameter message processor of the plurality of peer Diameter message processors to perform the at least one Diameter function on the first Diameter message, wherein the second peer Diameter message processor is configured to route, using the indication of the change in the ability of the first peer Diameter message processor, the first Diameter message to one or more of the plurality of peer Diameter message processors in the DSR capable of processing the Diameter message; and
sending the first Diameter message to the third peer Diameter message processor.

\* \* \* \* \*